(12) United States Patent
Sakaguchi

(10) Patent No.: US 8,965,074 B2
(45) Date of Patent: Feb. 24, 2015

(54) IMAGE PROCESSING APPARATUS

(75) Inventor: Takuya Sakaguchi, Shioya-gun (JP)

(73) Assignees: Kabushiki Kaisha Toshiba, Tokyo (JP); Toshiba Medical Systems Corporation, Otawara-shi (JP)

(*) Notice: Subject to any disclaimer, the term of this patent is extended or adjusted under 35 U.S.C. 154(b) by 0 days.

(21) Appl. No.: 12/535,738

(22) Filed: Aug. 5, 2009

(65) Prior Publication Data

US 2009/0295797 A1    Dec. 3, 2009

Related U.S. Application Data

(62) Division of application No. 11/364,194, filed on Mar. 1, 2006, now Pat. No. 8,335,357.

(30) Foreign Application Priority Data

Mar. 4, 2005 (JP) ................................. 2005-061600
Mar. 4, 2005 (JP) ................................. 2005-061601

(51) Int. Cl.
| | |
|---|---|
| *G06K 9/00* | (2006.01) |
| *G06T 11/00* | (2006.01) |
| *G01C 11/06* | (2006.01) |
| *G06T 7/00* | (2006.01) |
| *H04N 13/02* | (2006.01) |

(52) U.S. Cl.
CPC .............. *G06T 11/005* (2013.01); *G01C 11/06* (2013.01); *G06T 7/0075* (2013.01); *G06T 2207/10116* (2013.01); *G06T 2207/30101* (2013.01); *G06T 2211/404* (2013.01); *H04N 13/026* (2013.01)
USPC ........... 382/128; 382/131; 345/419; 345/427; 345/581; 345/582; 378/4; 378/21; 378/23; 378/24; 378/25; 378/26; 378/27

(58) Field of Classification Search
USPC .......... 382/128, 130, 131, 276; 345/419, 427, 345/581, 582; 378/4, 21, 23–27
See application file for complete search history.

(56) References Cited

U.S. PATENT DOCUMENTS

| | | | |
|---|---|---|---|
| 6,047,080 A | 4/2000 | Chen et al. | |
| 6,501,848 B1 * | 12/2002 | Carroll et al. ................. | 382/128 |
| 2003/0001859 A1 * | 1/2003 | Sloan et al. ................... | 345/584 |
| 2004/0066958 A1 * | 4/2004 | Chen et al. .................... | 382/128 |
| 2004/0085327 A1 * | 5/2004 | Jones et al. ................... | 345/591 |
| 2007/0248319 A1 | 10/2007 | Sakuguchi | |
| 2008/0137934 A1 | 6/2008 | Sakuguchi et al. | |

FOREIGN PATENT DOCUMENTS

| | | |
|---|---|---|
| JP | 8-131429 | 5/1996 |
| JP | 2000-217035 | 8/2000 |
| JP | 2002-336222 | 11/2002 |

* cited by examiner

*Primary Examiner* — Matthew Bella
*Assistant Examiner* — Julian Brooks
(74) *Attorney, Agent, or Firm* — Oblon, Spivak, McClelland, Maier & Neustadt, L.L.P.

(57) ABSTRACT

An image processing apparatus includes a memory unit which stores data of a first projection image and data of a second projection image, which are associated with the same object and are captured in different imaging directions, a display unit which displays the data of the first projection image and the data of the second projection image, a designation operation unit which is configured to designate a plurality of points on the displayed first and second projection images, and an operation supporting unit which generates operation supporting information for supporting an operation of designating, by the designation operation unit, the plurality of points on the second image, which anatomically correspond to the plurality of points designated on the first projection image.

5 Claims, 20 Drawing Sheets

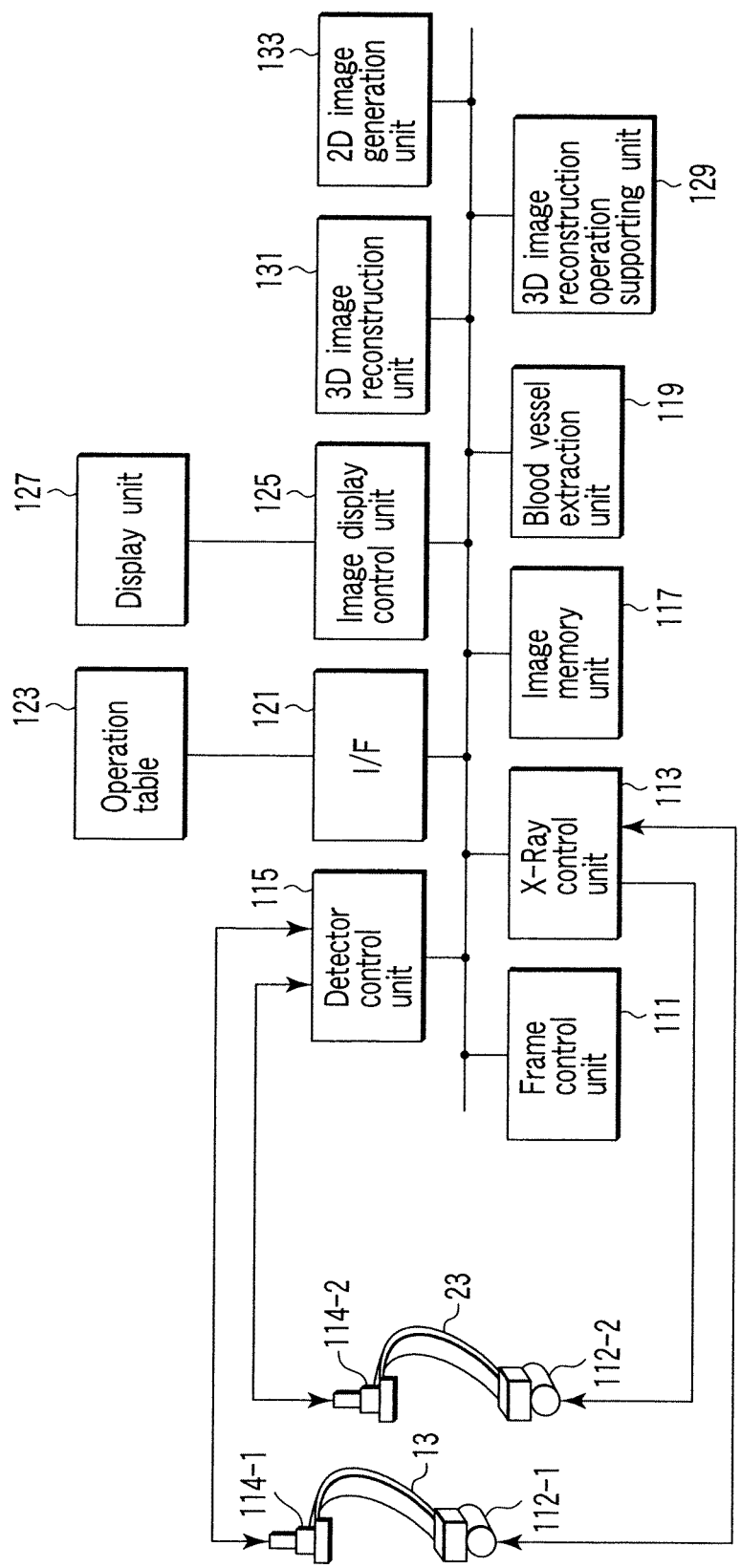
F I G. 1

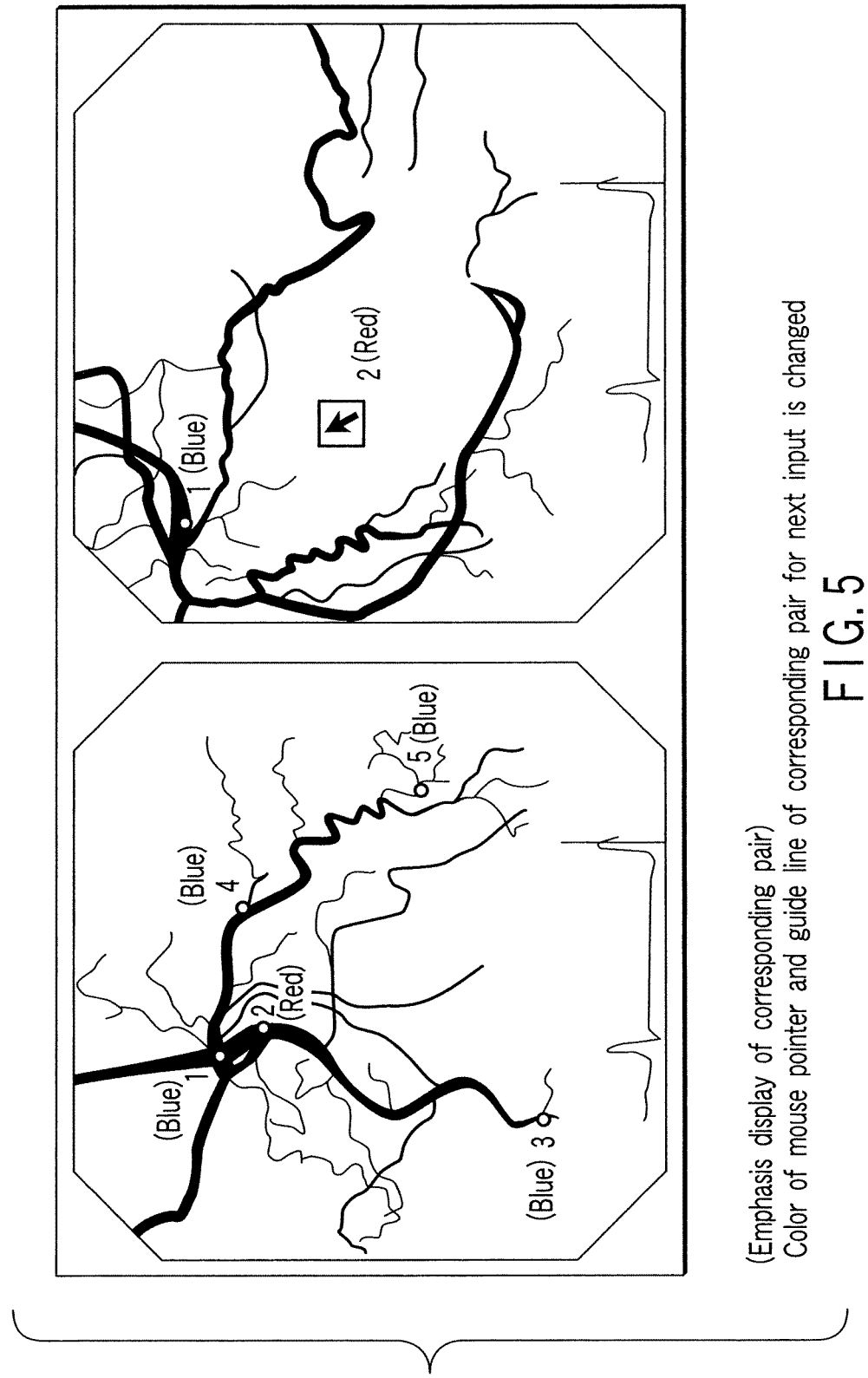
(Emphasis display of corresponding pair)
Color of mouse pointer and guide line of corresponding pair is changed
F I G. 5

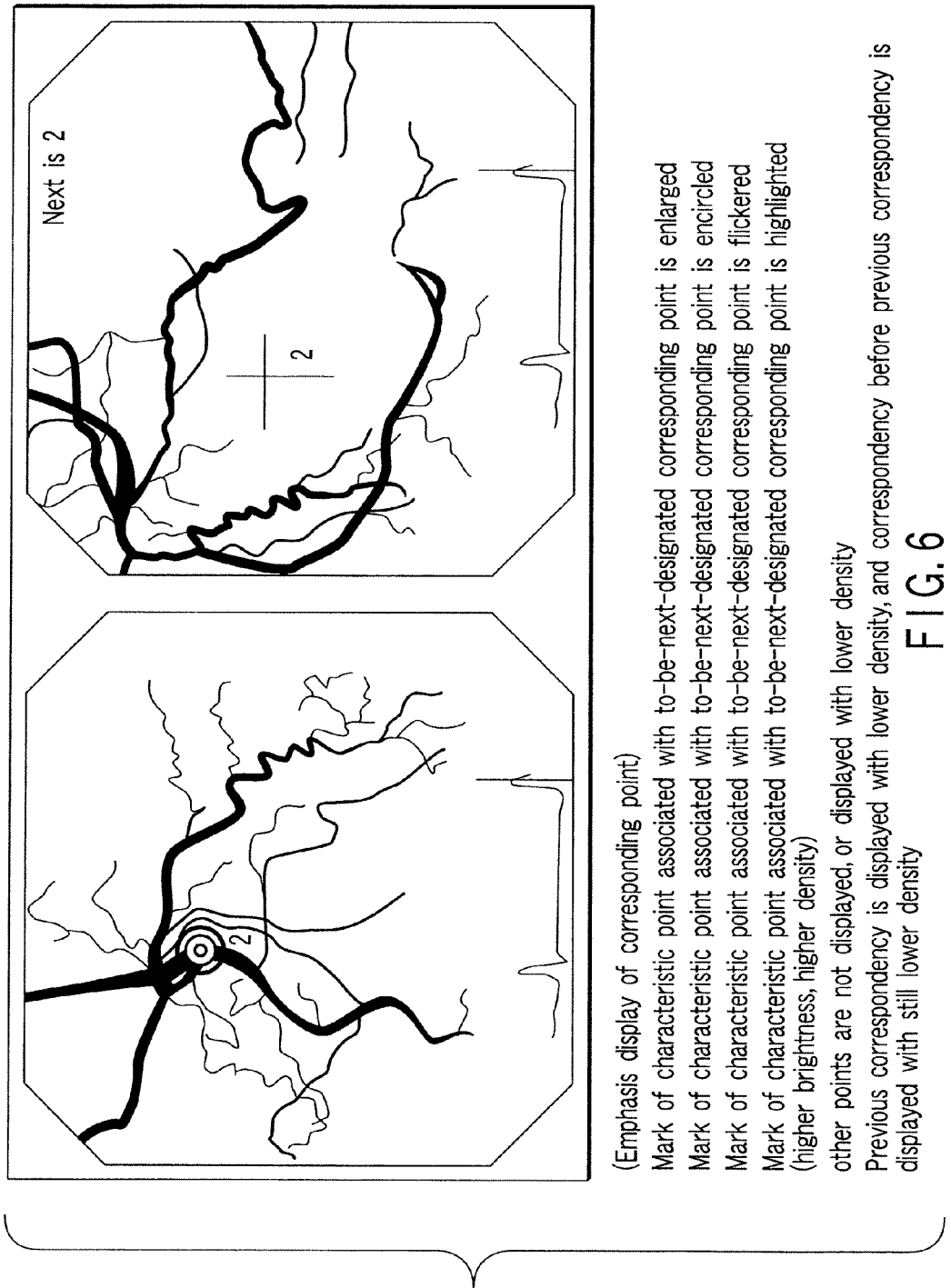

FIG. 6

(Emphasis display of corresponding point)
Mark of characteristic point associated with to-be-next-designated corresponding point is enlarged
Mark of characteristic point associated with to-be-next-designated corresponding point is encircled
Mark of characteristic point associated with to-be-next-designated corresponding point is flickered
Mark of characteristic point associated with to-be-next-designated corresponding point is highlighted
(higher brightness, higher density)
other points are not displayed, or displayed with lower density
Previous correspondency is displayed with lower density, and correspondency before previous correspondency is displayed with still lower density 3D Image

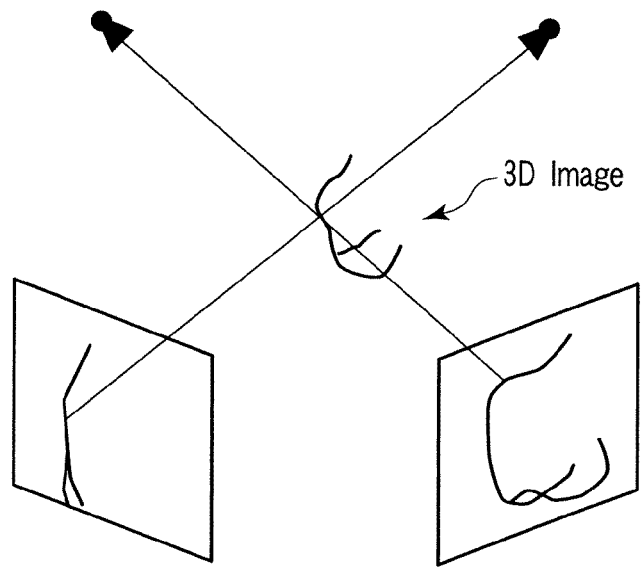
F I G. 14
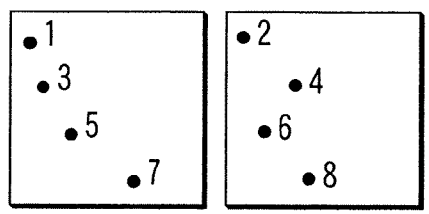
F I G. 15A
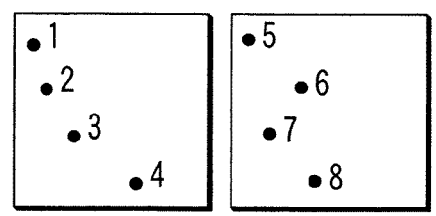
F I G. 15B

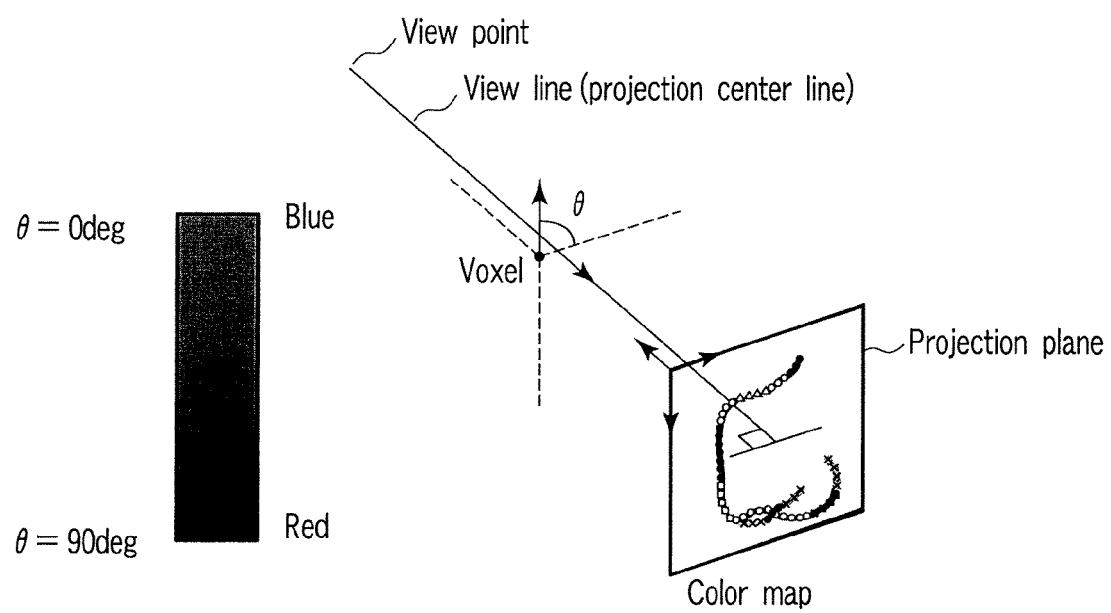
F I G. 18

Projection image B          Projection image A

Tangent vector of one point (voxel) on center line is uniquely determined

Voxel

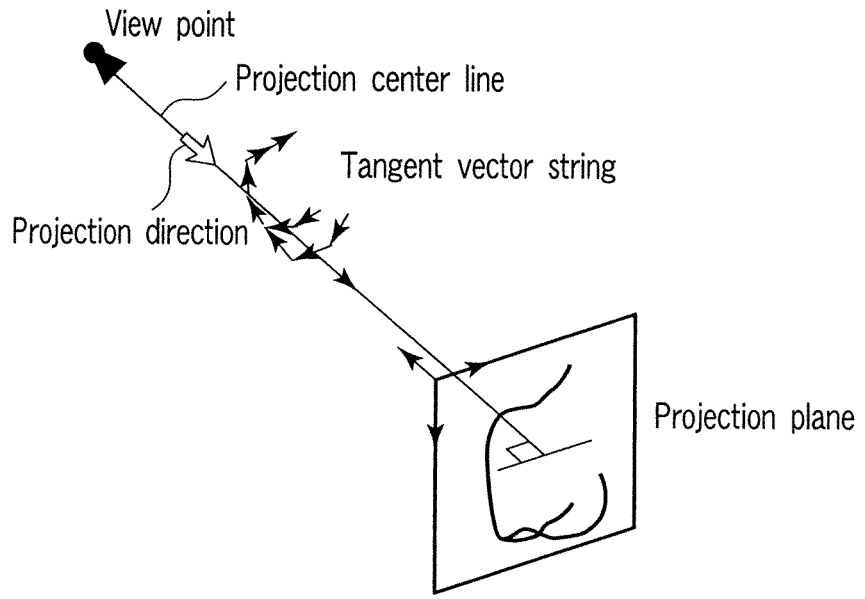
F I G. 22
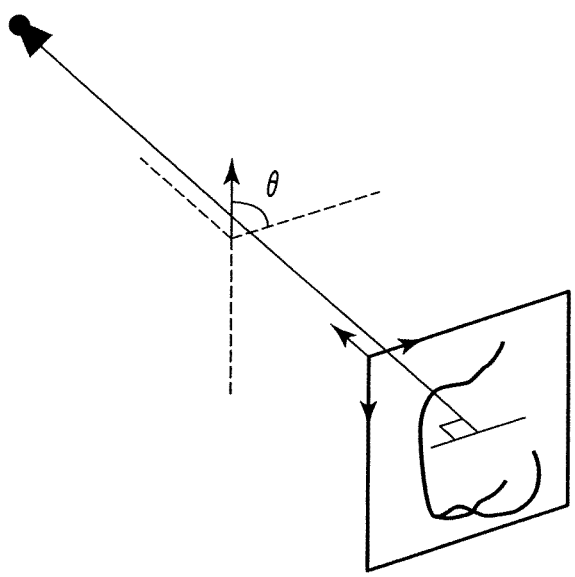
F I G. 23

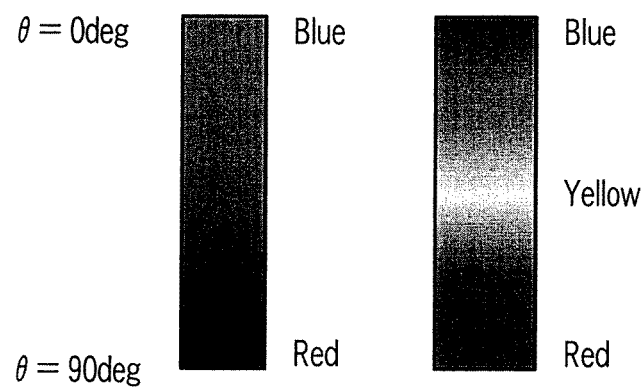
F I G. 24A    F I G. 24B
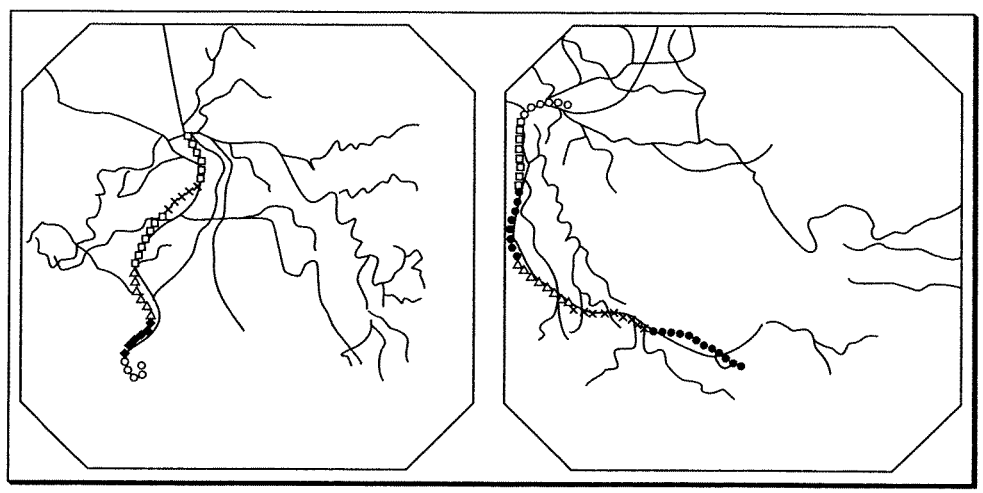
F I G. 25

IMAGE PROCESSING APPARATUS

CROSS-REFERENCE TO RELATED APPLICATIONS

This application is a division of and claims the benefit of priority under 35 U.S.C. §120 from U.S. Ser. No. 11/364,194 filed Mar. 1, 2006, and claims the benefit of priority under 35 U.S.C. §119 from Japanese Patent Applications Nos. 2005-061600 filed Mar. 4, 2005; and No. 2005-061601 filed Mar. 4, 2005, the entire contents of each of which are incorporated herein by reference.

BACKGROUND OF THE INVENTION

1. Field of the Invention

The present invention relates to an image processing apparatus having a function of reconstructing a three-dimensional (3D) image from projection images that are captured from two directions, or a function of generating projection image data from volume data relating to a configuration of a fine tubular object such as a blood vessel within a subject.

2. Description of the Related Art

There is known a technique of reconstructing a 3D image from projection images captured from two directions in order to visualize a running of, typically, a blood vessel, as shown in FIG. 11 and FIG. 14. To implement this technique, it is necessary to designate a correspondency between characteristic points of the images. For example, as shown in FIG. 13, it is understood that a part, which is projected at a point A on a lateral image (Lateral), is present somewhere on a line B within a 3D space. However, it is not possible to specify the part at one point. The line B is projected in another direction on a line C on a frontal image (Frontal), for instance. Thus, the part, which is projected at the point A, corresponds to a given position on the line C on the frontal image.

If the operator designates a point (characteristic point) A on the lateral image as an anatomically characteristic part and designates a point (corresponding point), which is associated with same part as the characteristic point A, on the line C on the frontal image, the position of the characteristic part on the line B can be specified. In short, in order to specify a 3D position, it is necessary to designate corresponding points on two-directional images in association with the same part.

Thus, the operator is required to perform a work to designate corresponding points on two-directional images by means of a pointer such as a mouse. By increasing the number of corresponding points, the precision of the 3D image is enhanced. When a 3D image of blood vessels, which branch in a complex fashion, is to be acquired, many corresponding points need to be designated.

Typical examples of the method of designating such corresponding points are shown in FIG. 15A and FIG. 15B. In FIG. 15A, corresponding points are alternately designated on images captured in two directions. In FIG. 15B, all corresponding points are first designated on one image, and then all associated corresponding points are designated on the other image.

Practically, it is very time-consuming to designate several-ten, in some cases, several-hundred corresponding points. In either of the above-described two methods, errors tend to occur in establishing the correspondency of the corresponding points.

There have been an increasing number of opportunities in which configurations of fine tubular objects, typically, blood vessels are displayed three-dimensionally. Practically, a projection image (re-projection image) is generated from 3D image data having depth information relating to blood vessels, and shading is added to the image to achieve three-dimensional visualization.

In fact, however, it is very difficult to understand the direction of running of blood vessels in the direction of image projection.

BRIEF SUMMARY OF THE INVENTION

An object of the present invention is to reduce the load of a work of designating corresponding points, which are associated with a common part, on projection images captured in two directions, this work being needed when a 3D image is reconstructed from the projection images captured in two directions, and to provide an operation support to avoid erroneous designation of such corresponding points.

Another object of the invention is to provide an image processing apparatus and an image processing method for displaying a projection image relating to an object of a fine tubular shape, such as a blood vessel, along with information of the direction of running of the object.

According to a first aspect of the present invention, there is provided an image processing apparatus comprising: a memory unit which stores data of a first projection image and data of a second projection image, which are associated with the same object and are captured in different imaging directions; a display unit which displays the data of the first projection image and the data of the second projection image; a designation operation unit which is configured to designate a plurality of points on the displayed first and second projection images; and an operation supporting unit which generates operation supporting information for supporting an operation of designating, by the designation operation unit, the plurality of points on the second image, which anatomically correspond to the plurality of points designated on the first projection image.

According to a second aspect of the present invention, there is provided an image processing apparatus comprising: a memory unit which stores data of a plurality of projection images, which are associated with the same object and are captured in different imaging directions; a display unit which displays the data of the plurality of projection images; a designation operation unit which is configured to designate a plurality of points on the displayed projection images; and an operation supporting unit which generates operation supporting information for supporting an operation of designating, by the designation operation unit, a point on one of the plurality of projection images, which anatomically corresponds to at least one of points designated on another projection image of the plurality of projection images.

According to a third aspect of the present invention, there is provided an image processing apparatus comprising: a memory unit which stores data of a 3D image relating to a fine tubular object within a subject; a tangent vector calculation unit which calculates a tangent vector of the object with respect to multiple points on the object, using the data of the 3D image; an angle calculation unit which calculates an angle of the tangent vector to a projection plane; a map generation unit which generates map data of the object by assigning a display mode, which corresponds to the calculated angle, to each of the multiple points; and a display unit which displays the map data.

According to a fourth aspect of the present invention, there is provided an image processing method comprising: calculating a tangent vector of an object with respect to multiple points on the object, using data of a 3D image relating to a fine tubular object within a subject; calculating an angle of the tangent vector to a projection plane which is arbitrarily set; generating map data of the object by assigning a display mode, which corresponds to the angle, to each of the multiple points; and displaying the map data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 shows the structure of an image processing apparatus according to a first embodiment of the present invention, together with the structure of an X-ray diagnosis apparatus including the image processing apparatus;

FIG. 5 shows an example of operational support by other display of the operation support unit shown in FIG. 1;

FIG. 6 shows an example of operational support by other display of the operation support unit shown in FIG. 1;

FIG. 14 illustrates an outline of 3D image reconstruction;

FIG. 15A and FIG. 15B show a procedure of designation of characteristic points in FIG. 12;

FIG. 18 shows an example of a blood vessel color map obtained by a blood vessel color map generation unit shown in FIG. 17;

FIG. 22 is a view for supplemental explanation of a process step of "determining a direction of projection";

FIG. 23 is a view for supplemental explanation of a process step of "calculating an angle θ between a tangent vector and a projection plane";

FIG. 24A and FIG. 24B are views for supplemental explanation of a process step of "replacing an angle θ with a color value"; and FIG. 25 shows an example of display in a process step of "superimposed displaying" in FIG. 19.

DETAILED DESCRIPTION OF THE INVENTION

First Embodiment

An image processing apparatus according to a first embodiment of the present invention (image processing apparatus) will now be described with reference to the accompanying drawings. In this embodiment, the image processing apparatus is described as being built in a biplane X-ray imaging apparatus. Needless to say, the image processing apparatus may be constructed as a single unit. In addition, this embodiment may be constructed as a program for causing a computer to execute a 3D image reconstruction process. A computer-readable memory medium that stores the program may also be provided.

The image processing apparatus of this embodiment is an apparatus having a function of reconstructing a 3D image from projection images captured in two directions (two-directional images). The kind or type of projection images is not limited. It is possible to use either two-directional images which are captured by a single-plane X-ray imaging apparatus, or two-directional images which are captured by a biplane X-ray imaging apparatus. In this example, general biplane X-ray imaging is employed.

Figure 16:
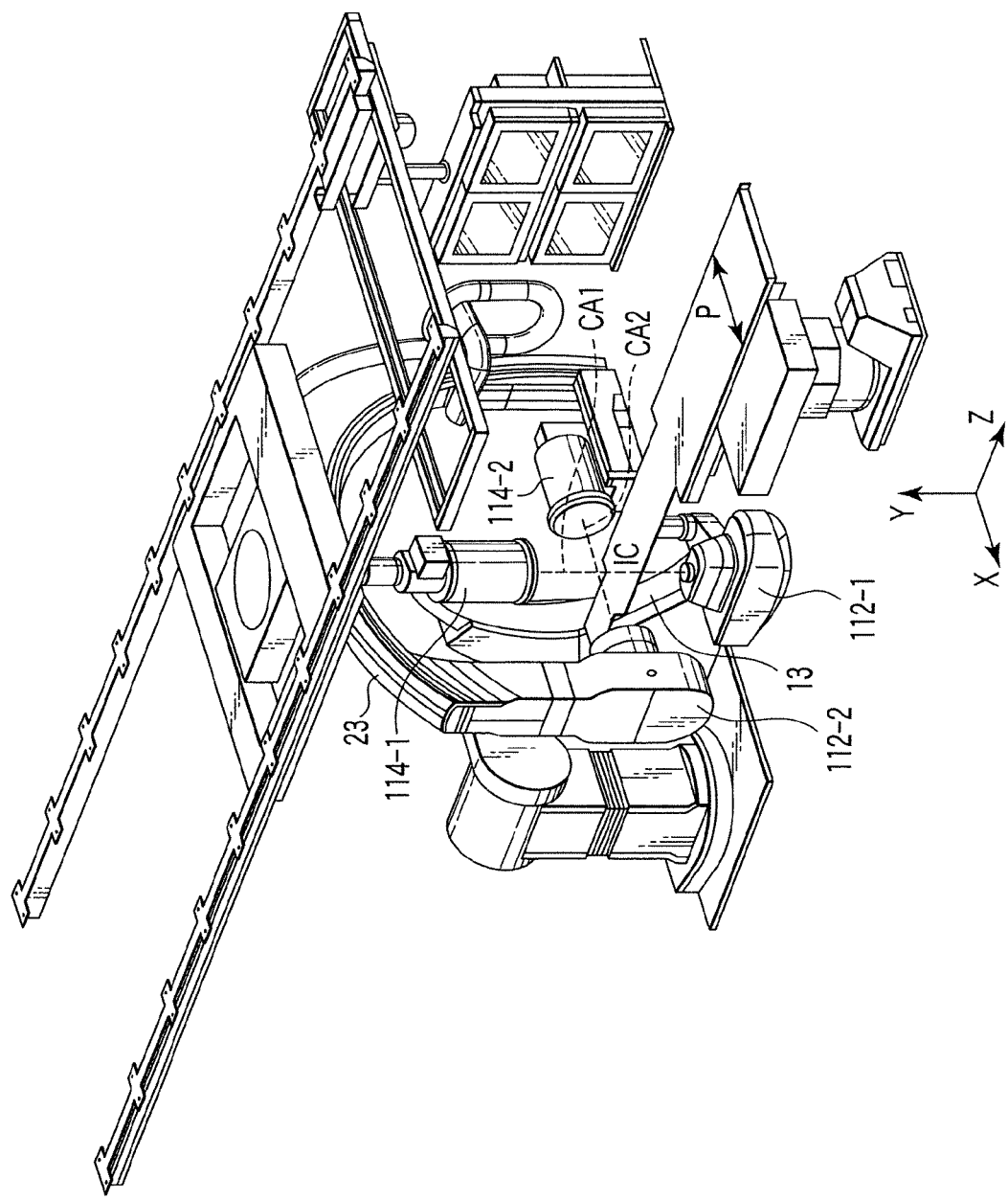
FIG. 16 shows the external appearance of a biplane X-ray imaging apparatus which is equipped with the image processing apparatus according to the embodiment.

FIG. 1 shows a biplane X-ray imaging apparatus which is equipped with the image processing apparatus of the present embodiment. To begin with, the biplane X-ray imaging apparatus is described in brief. As is shown in FIG. 16, the biplane X-ray imaging apparatus includes a frontal (F) X-ray imaging system and a lateral (L) X-ray imaging system. The frontal X-ray imaging system includes an X-ray tube 112-1 and an X-ray detector 114-1, which is exactly opposed to the X-ray tube 112-1 with a subject P interposed. The lateral X-ray imaging system includes an X-ray tube 112-2 and an X-ray detector 114-2, which is exactly opposed to the X-ray tube 112-2 with the subject P interposed. Typically, the X-ray detector 114-1, 114-2 is a solid planar detector on which a plurality of detection elements (pixels), which directly or indirectly convert incident X-rays to electric charge, are arranged two-dimensionally. The frontal X-ray tube 112-1 is attached to one end portion of, e.g. a floor-installation type C-arm 13, and the X-ray detector 114-1 is attached to the other end portion of the C-arm 13. The lateral X-ray tube 112-2 is attached to one end portion of, e.g. a ceiling-suspension type Ω-arm 23, and the X-ray detector 114-2 is attached to the other end portion of the Ω-arm 23. A support mechanism for the C-arm 13 and a support mechanism for the Ω-arm 23 are designed such that an imaging center axis CA1, which connects a focal point of the X-ray tube 112-1 and the center of the image-receiving plane of the X-ray detector 114-1, and an imaging center axis CA2, which connects a focal point of the X-ray tube 112-2 and the center of the image-receiving plane of the X-ray detector 114-2, intersect at a fixed point that is called "isocenter (IC)".

The biplane X-ray imaging apparatus, which is equipped with the image processing apparatus of the present embodiment, includes a frame control unit 111. The frame control unit 111 arbitrarily controls the positions and directions of the C-arm 13 and Ω-arm 23 in accordance with the operator's instruction that is input from an operation table 123 connected to the frame control unit 111 via an interface 121, and the frame control unit 111 acquires data relating to the imaging positions and imaging directions of the respective imaging systems from sensors (not shown). An image memory unit 117 stores the data relating to the imaging positions and imaging directions of the respective imaging systems, together with projection image data which is generated from the X-ray detectors 114-1 and 114-2 via a detector control unit 115 in sync with X-rays that are generated from the X-ray tubes 112-1 and 112-2 by application of tube voltage from an X-ray control unit 113. A display unit 127 is a display device such as a CRT, and is connected via an image display control unit 125. A blood vessel extraction unit 119 extracts an image of a blood vessel, which is formed of the projection image data by, e.g. a threshold process. A 3D image reconstruction operation supporting unit 129 is provided in order to support the operator's operation which is necessary for reconstructing a 3D image. Typically, when a corresponding point is designated on one of the projection images, the 3D image reconstruction operation supporting unit 129 outputs, as supporting information, information for specifying an already designated corresponding point on the other projection image, which is associated with the corresponding point that is to be designated on the one of the projection images. The operation support by the 3D image reconstruction operation supporting unit 129 will be described later in greater detail. A 3D image reconstruction unit 131 reconstructs 3D image data of the blood vessel image that is extracted from the projection images by the blood vessel extraction unit 119, on the basis of the positional relationship between a plurality of corresponding points designated by the operator under the operation support by the 3D image reconstruction operation supporting unit 129.

In the description below, 3D image data include the following two types (A) and (B).

3D image data of type (A) is mainly generated by a CT or an MRI. Even in an X-ray diagnosis apparatus, volume-reconstructed data corresponds to the 3D image data of type (A). 3D image data of type (A) have values with respect to all voxels within a 3D region. Specifically, with respect to a 3D region of, e.g. 512×512×512, 134, 217, 728 values are given.

3D image data of type (B) is given as a vector amount (vector data) that defines a 3D region. Specifically, 3D image data of type (B) is composed of, e.g. center-line coordinates and a diameter of a blood vessel. On the display device, the regions corresponding to the center-line coordinates and diameter are painted. The data mount of the 3D image data of type (B) is much smaller than the data amount of the 3D image data of type (A).

A 2D image generation unit 133 generates a pseudo-3D image (hereinafter referred to as "2D image" in order to avoid confusion with a 3D image) by, e.g. a projection process, on the basis of the 3D image data that is reconstructed by the 3D image reconstruction unit 131. The generated 2D image is displayed on the display unit 127.

Next, the operation support by the 3D image reconstruction operation supporting unit 129 is described. As is shown in FIG. 2A to 2E, the screen of the display unit 127 displays images A and B at the same time in a juxtaposed fashion, which are captured by imaging the same part substantially at the same time in different imaging directions by, e.g. a biplane X-ray imaging apparatus. Alternatively, the screen of the display unit 127 alternately displays the images A and B. For example, after all characteristic points are designated on the image A, the image B is displayed in place of the image A on the screen of the display unit 127.

Figure 2A:
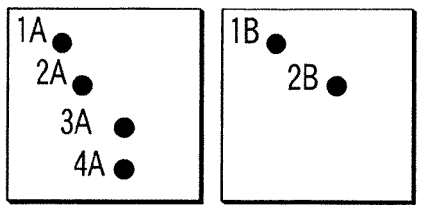
FIG. 2A to FIG. 2E show an example of operational support by display of an operation support unit shown in FIG. 1.
Figure 2B:
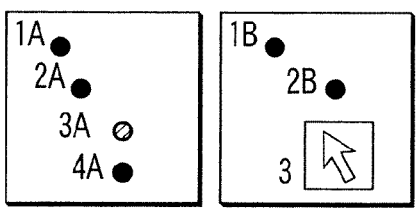

As is shown in FIG. 2A, by the operator's operation on the operation table 123 using a mouse or the like, a plurality of characteristic points 1A, 2A, 3A and 4A are designated at a plurality of anatomically characteristic parts, such as branch points, on a blood vessel image on the image A that is displayed on the display unit 127. For the purpose of convenience of description, corresponding points that are first designated on the image A are referred to as "characteristic points", and these characteristic points are distinguished from points (corresponding points) that are designated on the other image B in association with the corresponding characteristic points on the image A. After the designation of all characteristic points 1A, 2A, 3A and 4A is completed, it becomes possible to designate corresponding points on the region of the image B. By the operator's operation on the operation table 123 using the mouse, corresponding points 1B, 2B, . . . , which correspond to the characteristic points 1A, 2A, . . . , are designated on the image B on the display unit 127 in order in accordance with the order of the designation of the characteristic points. In this case, as shown in FIG. 2B, when a corresponding point 3B, for instance, which corresponds to the third characteristic point 3A on the image A, is to be designated on the image B, a mark which indicates the characteristic point 3A on the image A is displayed in a display mode different from the display mode of the other characteristic points 1A, 2A and 4A. For example, the mark which indicates the characteristic point 3A on the image A is displayed in red. The marks indicating the other characteristic points 1A, 2A and 4A are displayed in a color different from red, for example, in blue. Alternatively, the mark indicating the characteristic point 3A on the image A is displayed in a flickering mode. The other characteristic points 1A, 2A and 4A are always displayed.

Figure 2C:
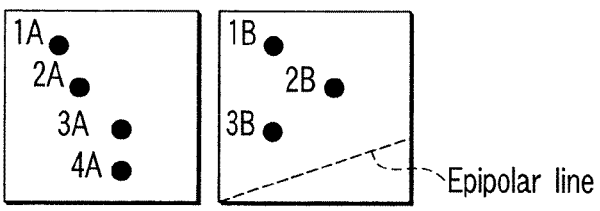

If the operator moves the mouse, an arrow-shaped pointer moves on the image B accordingly, along with symbol "3" that is indicative of the corresponding point 3B. When the operator moves the mouse to the same part as indicated by the characteristic point 3A, the operator clicks the mouse. Thereby, as shown in FIG. 2C, the corresponding point 3B is designated at that position, and the mark with "3B" indicating the corresponding point 3B is displayed, for example, in blue, which represents the designated state.

Figure 13:
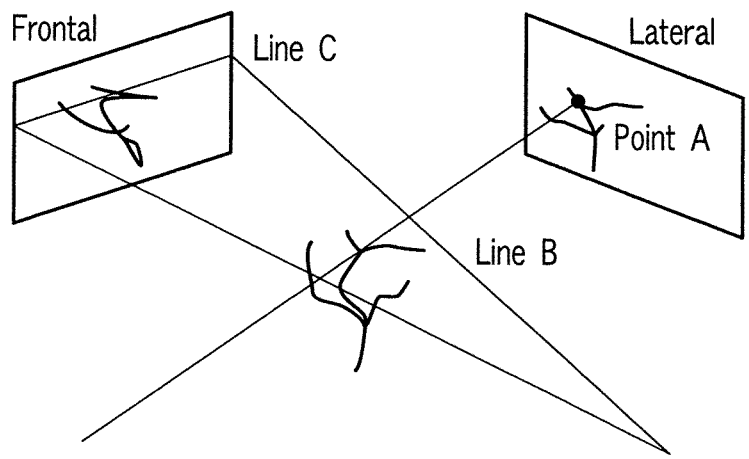
FIG. 13 is a supplemental view relating to the correspondency of characteristic points in FIG. 12.

Further when the corresponding point 3B is designated, the 3D image reconstruction operation supporting unit 129 determines whether the designated corresponding point 3B is away from an epipolar line by a predetermined distance or more. The epipolar line is defined as a line of candidate points for the corresponding point 3B that is to be designated on the image B. The epipolar line is determined by the imaging angle of the image A, the imaging angle of the image B, and the position of the point A3 on the image A. As is shown in FIG. 13, in the 3D coordinate system, the epipolar line is geometrically determined as a projection line that is obtained by projecting the line, which connects the focal point of the X-ray tube 112-1 and the characteristic point 3A on the image A (corresponding to the detection plane of detector 114-1), onto the image B (corresponding to the detection plane of detector 114-2) from the focal point of the X-ray tube 112-1.

There occurs no geometrical contradiction even if the corresponding point 3B is present on any position on the epipolar line. The operator designates the point 3B, which anatomically corresponds to the point 3A, from over the epipolar line.

Figure 2D:
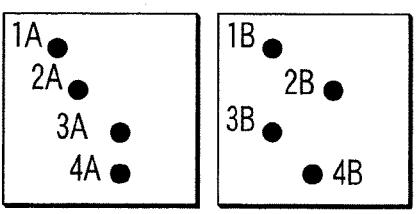
Figure 2E:
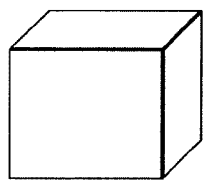

As is shown in FIG. 2D, the corresponding points 1B, 2B, 3B and 4B are designated on the image B in the same order as the characteristic points 1A, 2A, 3A and 4A on the image A. The designated corresponding points 1B, 2B, 3B and 4B are finally determined in accordance with a specific determining operation on the operation table 123. At the timing of the determination, a blood vessel image is extracted from each of the images A and B. From the extracted blood vessel image, the 3D image reconstruction unit 131 reconstructs 3D image data on the basis of the positional relationship between the characteristic points 1A, 2A, 3A and 4A and the corresponding points 1B, 2B, 3B and 4B (FIG. 2E).

Figure 10:
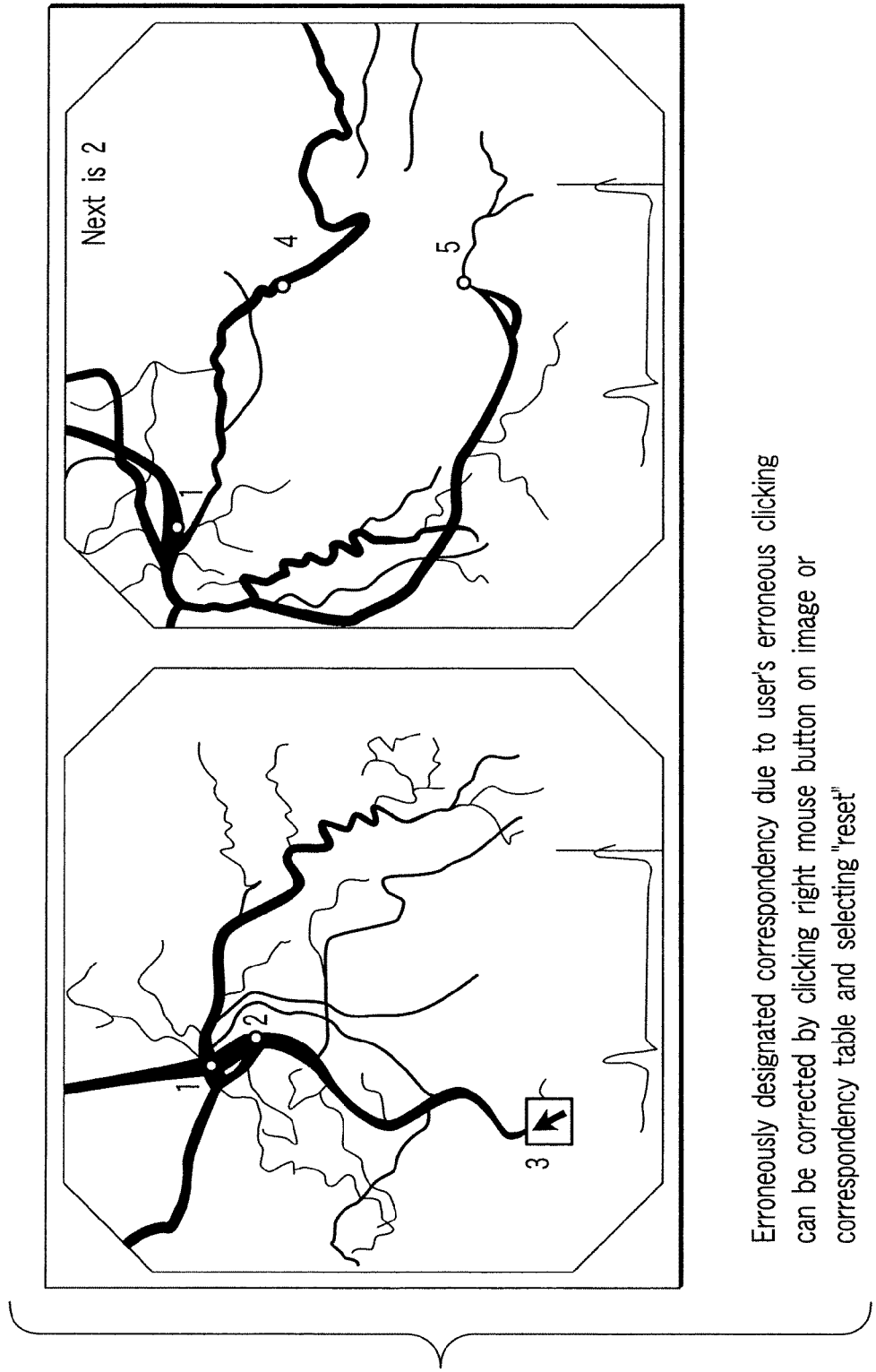
FIG. 10 shows an example of cancellation of corresponding-point designation by the operation support unit shown in FIG. 1.
Figure 11:
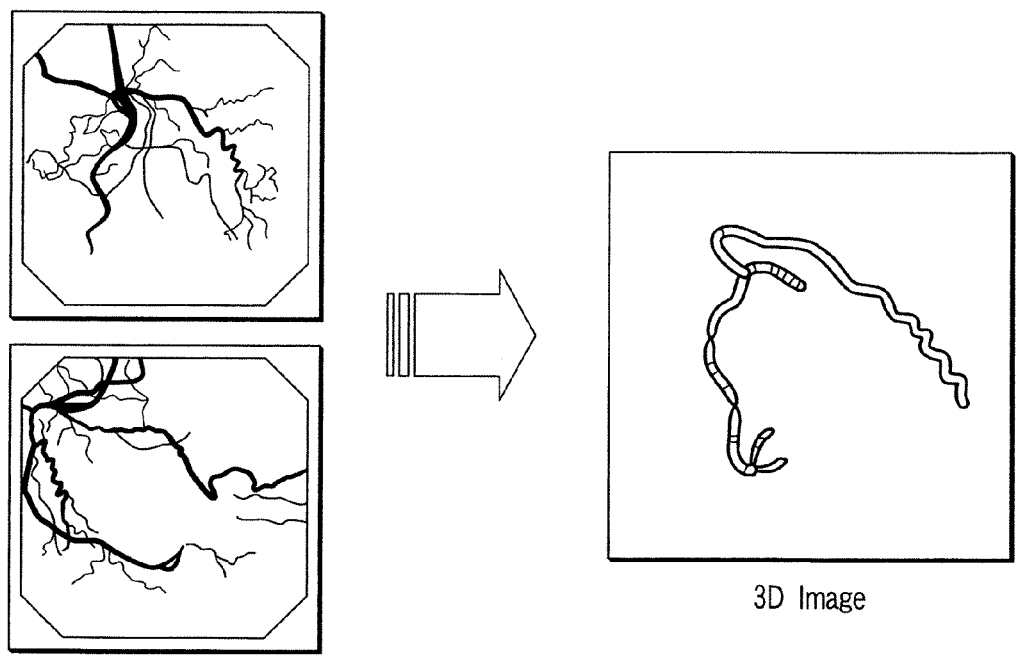
FIG. 11 illustrates an outline of 3D image reconstruction.
Figure 12:
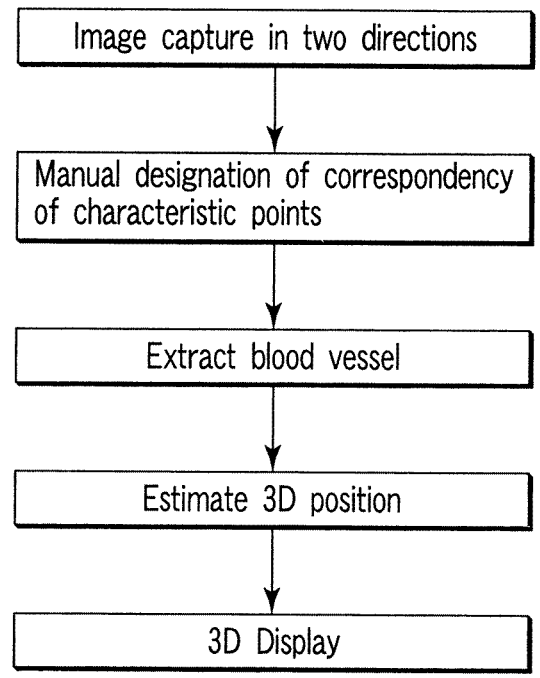
FIG. 12 illustrates a procedure of 3D image reconstruction.

In a case where a corresponding point is erroneously designated, the erroneous designation of the corresponding point can be canceled and re-designation of the corresponding point is enabled in the following manner. As shown in FIG. 10, the pointer is moved to the mark of the erroneously designated corresponding point, and a "reset" command is selected on a menu that is opened, for example, by clicking the right mouse button. Alternatively, the pointer is moved to a coordinate indication field of the erroneously designated corresponding point on a correspondency table shown in FIG. 8, and a "reset" command is selected on a menu that is opened similarly by clicking the right mouse button.

Figure 3A:
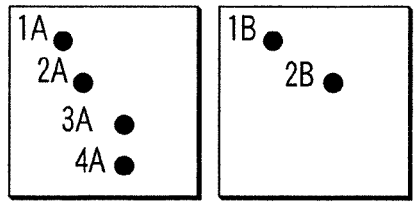
FIG. 3A to FIG. 3E show an example of operational support by an epipolar line of the operation support unit shown in FIG. 1.
Figure 3B:
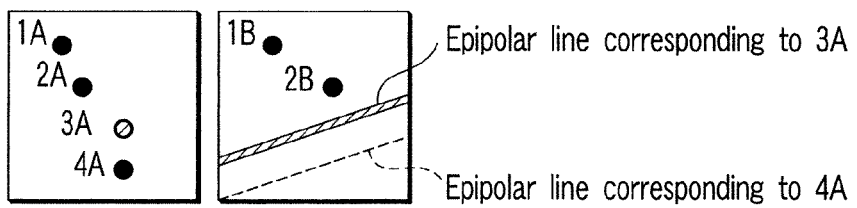

As shown in FIGS. 3A to 3E, the operation support can be realized by using the display of the epipolar line. As is shown in FIG. 3A, by the operator's operation on the operation table 123 using a mouse or the like, a plurality of characteristic points 1A, 2A, 3A and 4A are designated on the image A that is displayed on the display unit 127. Corresponding points 1B, 2B, . . . , which correspond to the characteristic points 1A, 2A, . . . , are designated on the image B on the display unit 127 in order in accordance with the order of the designation of the characteristic points. In this case, as shown in FIG. 3B, when a corresponding point 3B, for instance, which corresponds to the third characteristic point 3A, is to be designated on the image B by the operator, a mark which indicates the characteristic point 3A on the image A is displayed in a display mode different from the display mode of the other characteristic points 1A, 2A and 4A. For example, the mark indicating the characteristic point 3A on the image A is displayed in red. Further, an epipolar line corresponding to the characteristic point 3A on the image A is displayed with high brightness and large thickness. Epipolar lines corresponding to the characteristic points 1A and 2A on the image A, in association with which the corresponding points 1B and 1B have already been designated, are not displayed. An epipolar line corresponding to the characteristic point 4A on the image A, in association with which a corresponding point is yet to be designated, is displayed with low density and small thickness.

Figure 3C:
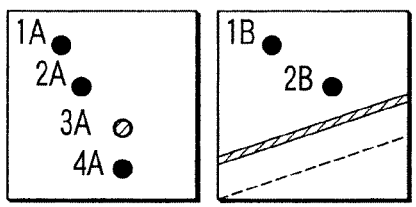
Figure 3D:
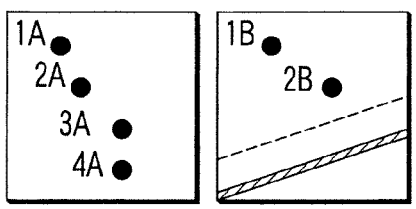
Figure 3E:
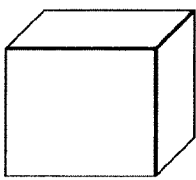
Figure 9:
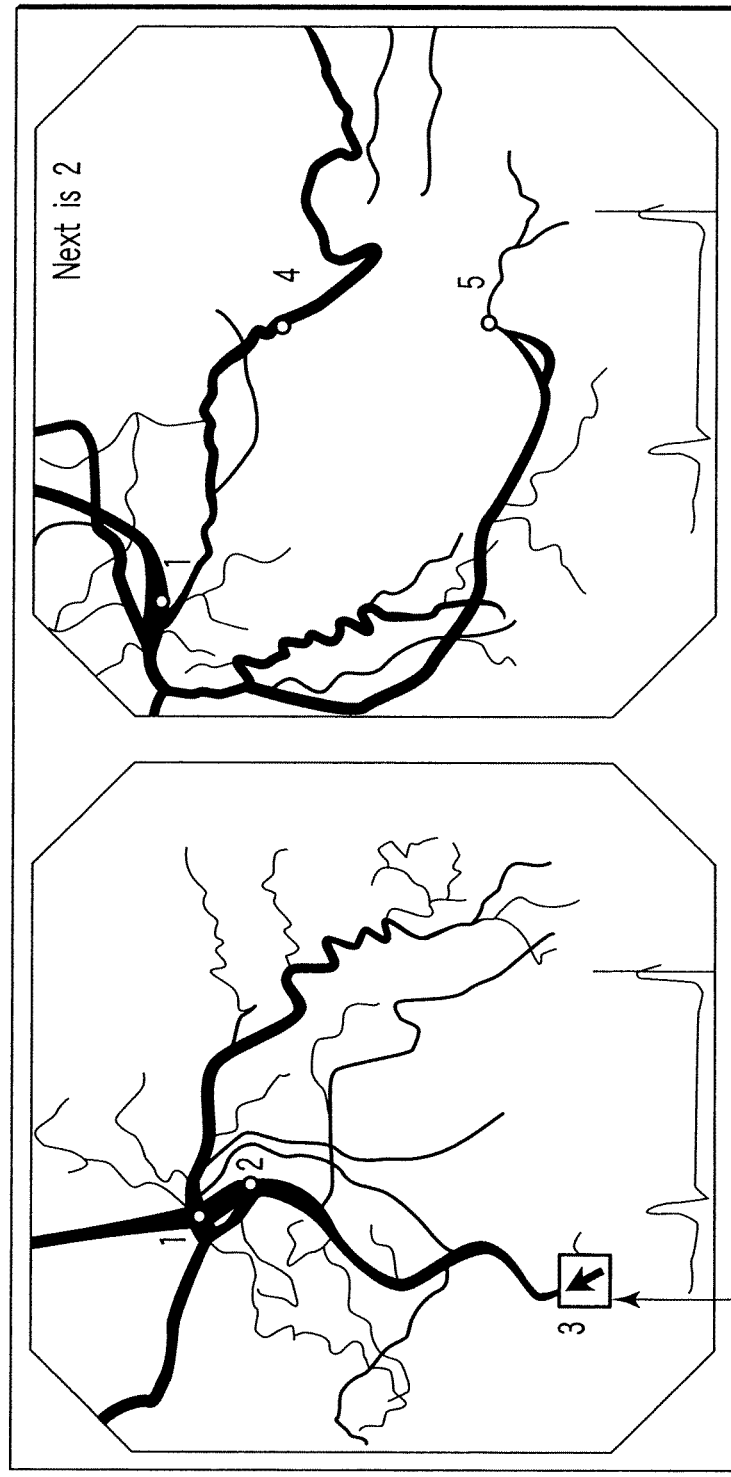
FIG. 9 shows another example of alteration of the corresponding-point designation order by the operation support unit shown in FIG. 1.

If the operator desires to first designate the corresponding point 4B prior to the corresponding point 3B, the operation supporting unit 129 can operate so as to enable such designation. As is shown in FIG. 3C and FIG. 9, the operator moves the mouse and positions the pointer at the mark of, e.g. the characteristic point 4A on the displayed image A. At this position, the operator clicks the mouse, and thereby the operation supporting unit 129 makes a transition to the state in which the designation of the corresponding point 4B corresponding to the characteristic point 4A, in place of the corresponding point 3B, can be accepted. Accordingly, as shown in FIG. 3D, the epipolar line corresponding to the characteristic point 4A on the image A is displayed on the image B in an altered display mode, that is, with high brightness and large thickness. By contrast, the epipolar line corresponding to the characteristic point 3A on the image A is displayed on the image B in an altered display mode, that is, with low density and small thickness. In this manner, the corresponding points 1B, 2B, 3B and 4B are designated on the image B in the same order as the characteristic points 1A, 2A, 3A and 4A on the image A. The designated corresponding points 1B, 2B, 3B and 4B are finally determined in accordance with a specific determining operation on the operation table 123. At the timing of the determination, a blood vessel image is extracted from each of the images A and B. From the extracted blood vessel image, the 3D image reconstruction unit 131 reconstructs 3D image data on the basis of the positional relationship between the characteristic points 1A, 2A, 3A and 4A and the corresponding points 1B, 2B, 3B and 4B (FIG. 3E).

Figure 4:
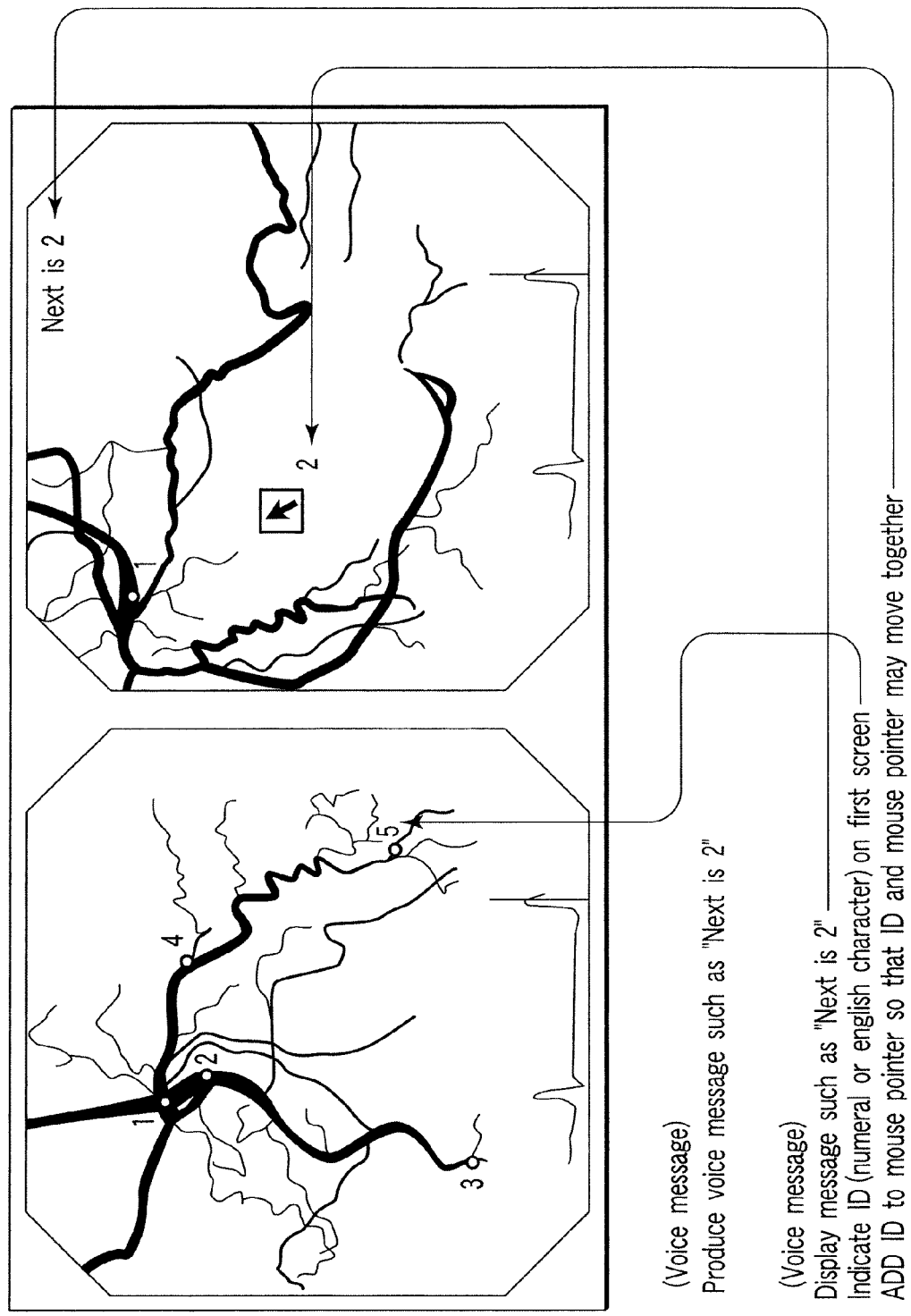
FIG. 4 shows an example of operational support by voice or messages of the operation support unit shown in FIG. 1.

In the above example, the mark indicating the characteristic point 3A, in association with which the corresponding point 3B, for instance, is to be next designated, is displayed in a different display mode from the display mode of the other characteristic points 1A, 2A and 4A, that is, in red or in a flickering display mode. Additionally or alternatively, as shown in FIG. 4, the operation supporting unit 129 may use a voice generator (not shown) to output voice representing the number of the next designated characteristic point. Further, the operation supporting unit 129 may cause the screen of the display unit 127 to display a text message representing the number of the next designated characteristic point, together with the images A and B. As shown in FIG. 5, the color of the pointer and guide line of the next designated corresponding point and the associated characteristic point may be changed, and the paired associated points may be displayed with emphasis. As shown in FIG. 6, the mark of the characteristic point, which is associated with the next designated corresponding point, may be displayed on the image A with a larger size than the marks of the other characteristic points. The mark of the characteristic point, which is associated with the next designated corresponding point, may be encircled on the image A, unlike the marks of the other characteristic points. Only the mark of the characteristic point, which is associated with the next designated corresponding point, may be displayed in a flickering mode. Only the mark of the characteristic point, which is associated with the next designated corresponding point, may be highlighted and displayed with high density. The characteristic marks, other than the mark of the characteristic point associated with the next designated corresponding point, may be displayed with low density or may not be displayed. The mark of the characteristic point, which is associated with the immediately previously designated corresponding point, may be displayed with relatively low density, and the mark of the characteristic point, which is associated with the designated corresponding point before the immediately previously designated corresponding point, may be displayed with still lower density.

Figure 7:
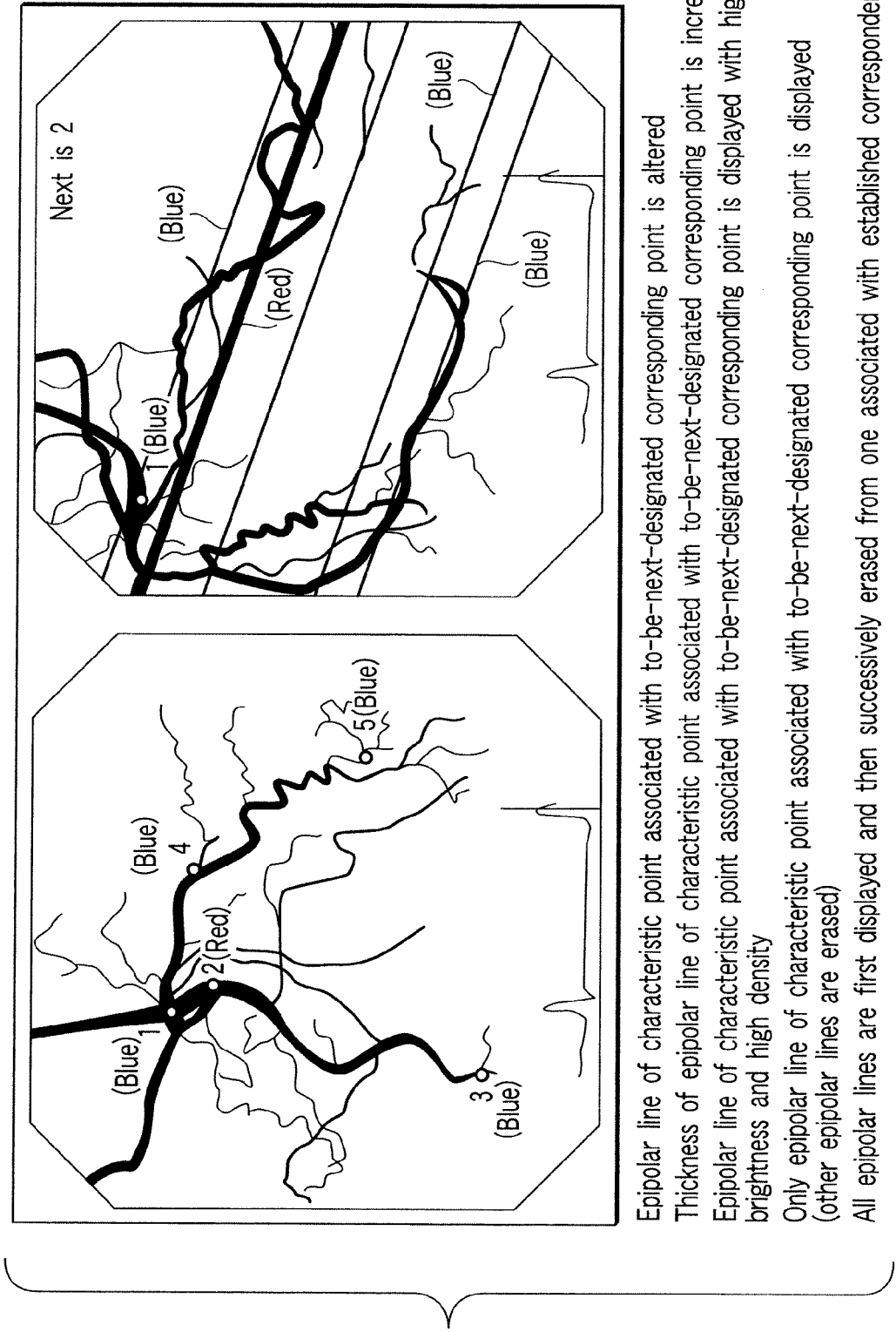
FIG. 7 shows another example of display of an epipolar line of the operation support unit shown in FIG. 1.

The display of the epipolar line shown in FIG. 3 may be applied as follows. As is shown in FIG. 7, epipolar lines corresponding to all characteristic points may be displayed on the image B, and the epipolar line corresponding to the characteristic point, which is associated with the next designated corresponding point, may be displayed in a color different from the color of the epipolar lines corresponding to the other characteristic points. Epipolar lines corresponding to all characteristic points may be displayed on the image B, and the epipolar line corresponding to the characteristic point, which is associated with the next designated corresponding point, may be displayed with a greater line thickness than the line thickness of the epipolar lines corresponding to the other characteristic points. Epipolar lines corresponding to all characteristic points may be displayed on the image B, and the epipolar line corresponding to the characteristic point, which is associated with the next designated corresponding point, may be displayed with higher brightness and high color density than the epipolar lines corresponding to the other characteristic points. Alternatively, epipolar lines corresponding to all characteristic points may not be displayed on the image B, and only the epipolar line corresponding to the characteristic point, which is associated with the next designated corresponding point, may be displayed while the epipolar lines corresponding to the other characteristic points are not displayed. Epipolar lines corresponding to all characteristic points may be displayed at the beginning, and each time a corresponding point is designated, the epipolar line corresponding to the characteristic point associated with the designated corresponding point may be erased.

Figure 8:
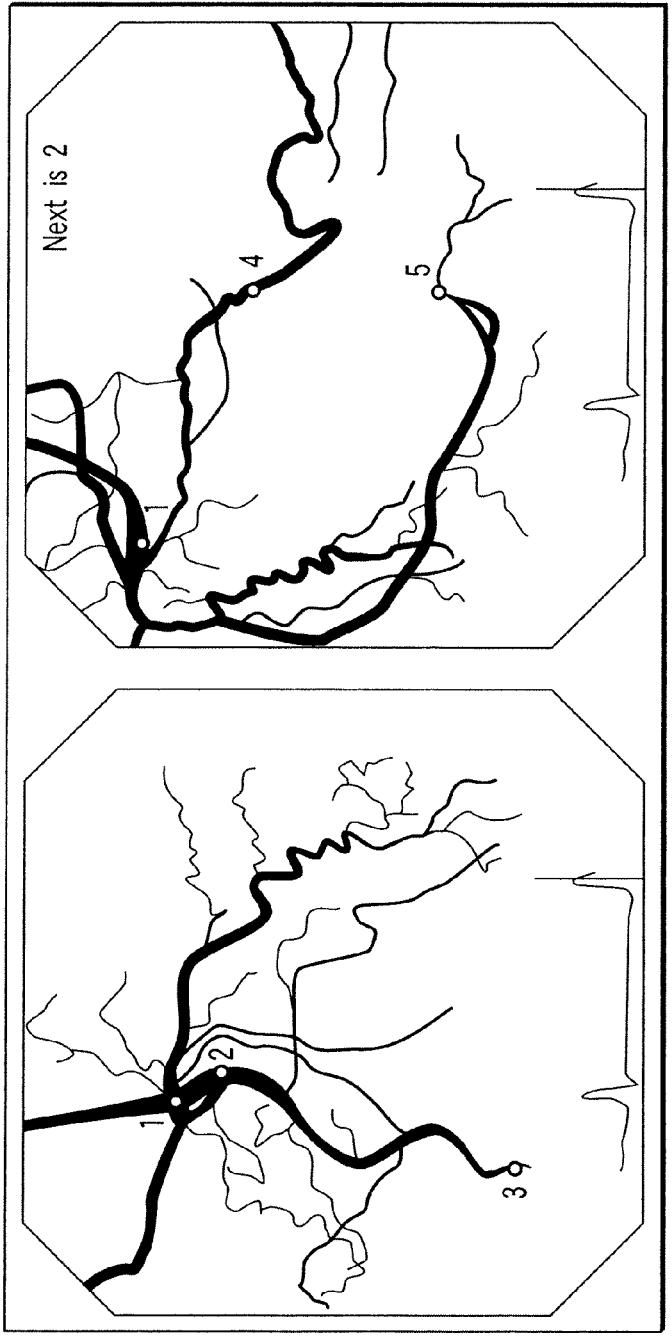
FIG. 8 shows an example of alteration of a corresponding-point designation order by the operation support unit shown in FIG. 1.

The order of designation of corresponding points is initially set to correspond to the order of designation of characteristic points. However, as shown in FIG. 3C and FIG. 3D, the order may be changed by clicking the mark of the characteristic point associated with the next designated corresponding point. The method of changing the order is not limited to this operation. For example, as shown in FIG. 8, the operation supporting unit 129 generates a correspondency table in which characteristic points and corresponding points are associated with indication of XY coordinates on the images, and the display unit 127 can display the correspondency table together with the images A and B. On the correspondency table, the next designated corresponding point is indicated by "next". If some other corresponding point is to be next designated, a coordinate indication field on the correspondency table, which corresponds to this corresponding point, is clicked. Thereby, the corresponding point 3, in this example, can be set in such a state as to be next designated.

As has been described above, according to the present embodiment, it is possible to reduce the load of a work of designating corresponding points, which are associated with a common part, on projection images captured in two directions, this work being needed when a 3D image is reconstructed from the projection images captured in two directions. It is also possible to provide an operation support to avoid erroneous designation of such corresponding points.

Second Embodiment

An image processing apparatus according to a second embodiment of the present invention will now be described with reference to the accompanying drawings. In this embodiment, the image processing apparatus is described as being built in a biplane X-ray imaging apparatus. Needless to say, the image processing apparatus may be constructed as a single unit. In addition, this embodiment may be constructed as a program for causing a computer to execute an image process of the image processing apparatus. A computer-readable memory medium that stores the program may also be provided.

In the description below, an object that is to be processed by the image processing apparatus of this embodiment is 3D image data (volume data) of a blood vessel, which is reconstructed from X-ray projection images that are captured substantially at the same time in two directions. However, the object to be processed by the image processing apparatus is not limited to this. The object to be processed by the image processing apparatus may be 3D image data of a blood vessel, which is reconstructed from projection images that are captured by a single-plane X-ray imaging apparatus at different times in two directions, or volume data derived from data that is acquired by other imaging apparatuses such as an X-ray computed tomography imaging apparatus (CT scanner) and a magnetic resonance imaging apparatus (MRI).

Objects for the image process are fine tubular ones that are preset in the subject, and are typically blood vessels, but the objects are not limited to blood vessels. The objects may be a catheter, a guide wire, a stent, an intravascular treatment device, a biopsy needle, forceps, an endoscope, etc.

Figure 17:
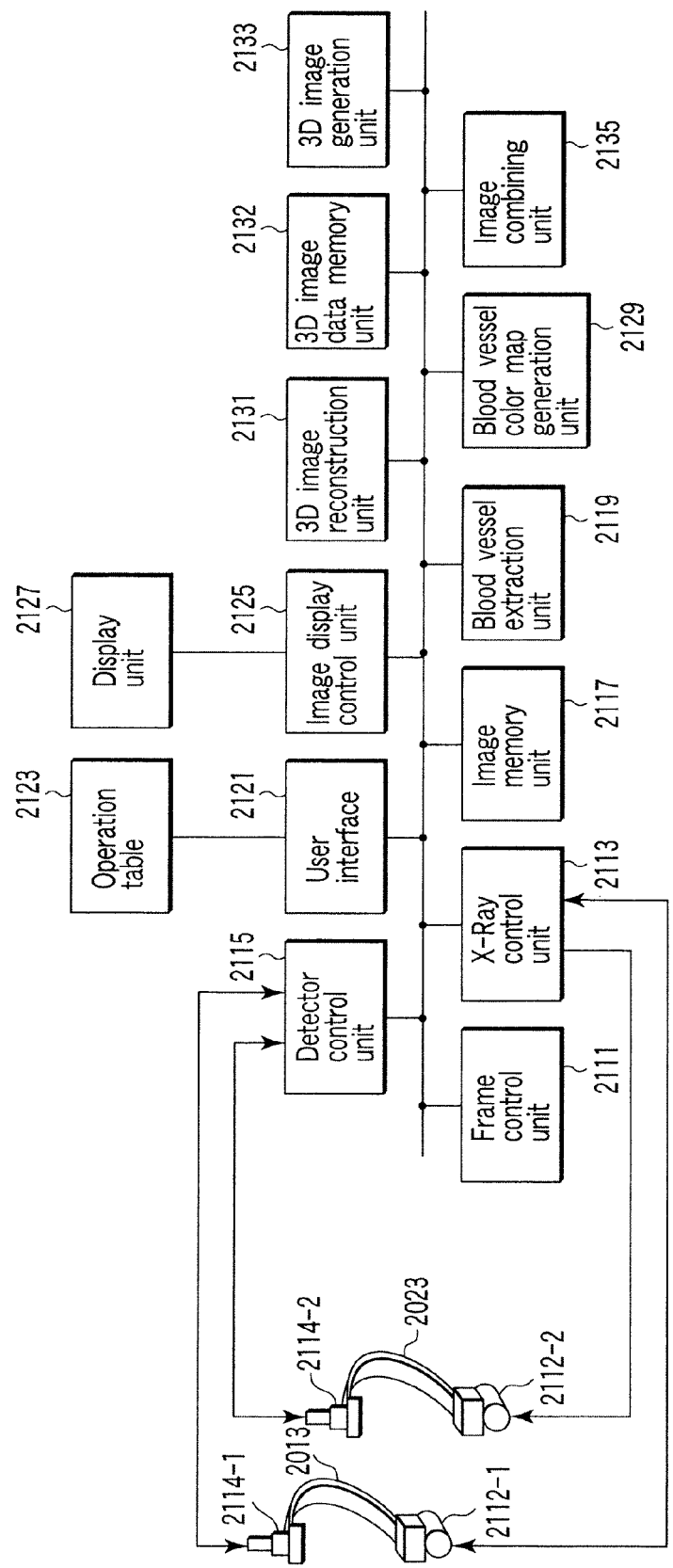
FIG. 17 shows the structure of an image processing apparatus according to a second embodiment of the present invention, together with the structure of an X-ray diagnosis apparatus including the image processing apparatus.

FIG. 17 shows a biplane X-ray imaging apparatus which is equipped with the image processing apparatus of the present embodiment. To begin with, the biplane X-ray imaging apparatus is described in brief. The biplane X-ray imaging apparatus includes a frontal (F) X-ray imaging system and a lateral (L) X-ray imaging system. The frontal X-ray imaging system includes an X-ray tube 2112-1 and an X-ray detector 2114-1, which is exactly opposed to the X-ray tube 2112-1 with a subject P interposed. The lateral X-ray imaging system includes an X-ray tube 2112-2 and an X-ray detector 2114-2, which is exactly opposed to the X-ray tube 2112-2 with the subject P interposed. Typically, the X-ray detector 2114-1, 2114-2 is a solid planar detector on which a plurality of detection elements (pixels), which directly or indirectly convert incident X-rays to electric charge, are arranged three-dimensionally. The frontal X-ray tube 2112-1 is attached to one end portion of, e.g. a floor-installation type C-arm 2013, and the X-ray detector 2114-1 is attached to the other end portion of the C-arm 2013. The lateral X-ray tube 2112-2 is attached to one end portion of, e.g. a ceiling-suspension type Ω-arm 2023, and the X-ray detector 2114-2 is attached to the other end portion of the Ω-arm 2023. A support mechanism for the C-arm 2013 and a support mechanism for the Ω-arm 2023 are designed such that an imaging center axis CA1, which connects a focal point of the X-ray tube 2112-1 and the center of the image-receiving plane of the X-ray detector 2114-1, and an imaging center axis CA2, which connects a focal point of the X-ray tube 2112-2 and the center of the image-receiving plane of the X-ray detector 2114-2, intersect at a fixed point that is called "isocenter".

A frame control unit 2111 arbitrarily controls the positions and directions of the C-arm 2013 and Ω-arm 2023 in accordance with the operator's instruction that is input from an operation table 2123 connected to the frame control unit 2111 via an user interface 2121, and the frame control unit 2111 acquires data relating to the imaging positions and imaging directions of the respective imaging systems from sensors (not shown). An image memory unit 2117 stores the data relating to the imaging positions and imaging directions of the respective imaging systems, together with projection image data which is generated from the X-ray detectors 2114-1 and 2114-2 via a detector control unit 2115 in sync with X-rays that are generated from the X-ray tubes 2112-1 and 2112-2 by application of tube voltage from an X-ray control unit 2113. A display unit 2127 is a display device such as a CRT, and is connected via an image display control unit 2125. A blood vessel extraction unit 2119 extracts an image of a blood vessel, which is formed by, e.g. a threshold process, from the projection image data. A 3D image reconstruction unit 2131 reconstructs 3D image data (also referred to as "volume data") of the blood vessel that is extracted from the projection images by the blood vessel extraction unit 2119, on the basis of the positional relationship between a plurality of corresponding points which are designated by the operator and are associated with the same part between two projection images captured in two different imaging directions. A 3D image data memory unit 2132 stores 3D image data that is reconstructed by the 3D image reconstruction unit 2131.

As mentioned above, the 3D image data memory unit 2132 may be configured to store 3D image data that is generated from image data acquired by other imaging apparatuses such as an X-ray computed tomography imaging apparatus (CT scanner) and a magnetic resonance imaging apparatus (MRI). A 2D image generation unit 2133 generates a projection image as a 3D image representing a configuration of a blood vessel in a pseudo-manner (a projection image representing a blood vessel configuration) by projecting the 3D image data, which is stored in the 3D image data memory unit 2132, on a projection plane corresponding to an arbitrary view angle (imaging direction) at an arbitrary view point. The generated projection image representing the blood vessel configuration is displayed on the display unit 2127.

A blood vessel color map generation unit 2129 extracts a center axis (center line) of the blood vessel from the 3D image data stored in the 3D image data memory unit 2132, calculates a tangent vector of the blood vessel with respect to multiple points (voxels) on the center axis of the blood vessel, and calculates the angle of the tangent vector to the projection plane (angle between the tangent vector and the projection plate) with respect to each point (voxel). This angle represents the direction of running of the blood vessel. Further, the blood vessel color map generation unit 2129 converts the angle to a color value according to a pre-stored color table, and generates volume data in which the color value is set as a voxel value (hereinafter referred to as volume data relating to the direction of running of the blood vessel). The blood vessel color map generation unit 2129 projects the generated volume data relating to the direction of running of the blood vessel on the same projection plane with the same view point and the same view angle as the projection image representing the blood vessel configuration, thereby generating a color map as a projection image representing the direction of running of the blood vessel (i.e. the projection image representing the direction of running of the blood vessel). The generated color map is superimposed on the projection image representing the blood vessel configuration in an image combining unit 2135, and the resultant image is displayed on the display unit 2127.

The generation of the color map representing the direction of running of the blood vessel is described below in detail. As is shown in FIG. 18, the color map is a map representing the direction of running of the blood vessel in color, for example, with color values being set as pixel values, in a display mode corresponding to the angle θ of blood vessel tangent vectors of respective points on a projection plane that is set so as to intersect at right angles with a viewing line (projection center line) from a view point that is designated by the operator. In the example of FIG. 18, a blood vessel portion, which is perpendicular to the projection plane, is displayed in red, and a blood vessel portion, which is parallel to the projection plane is displayed in blue. Blood vessel portions, which cross the projection plane at intermediate angles, are displayed in gradient hues between red and blue.

In FIG. 18, for the purpose of convenience, the difference in color is expressed by the difference in dot pattern, such as a dotted line, a triangle, a circle and an X mark. Along with the color values or in place of the color values, dot patterns corresponding to the ranges of angles θ of blood vessel tangent vectors may be assigned.

Figure 19:
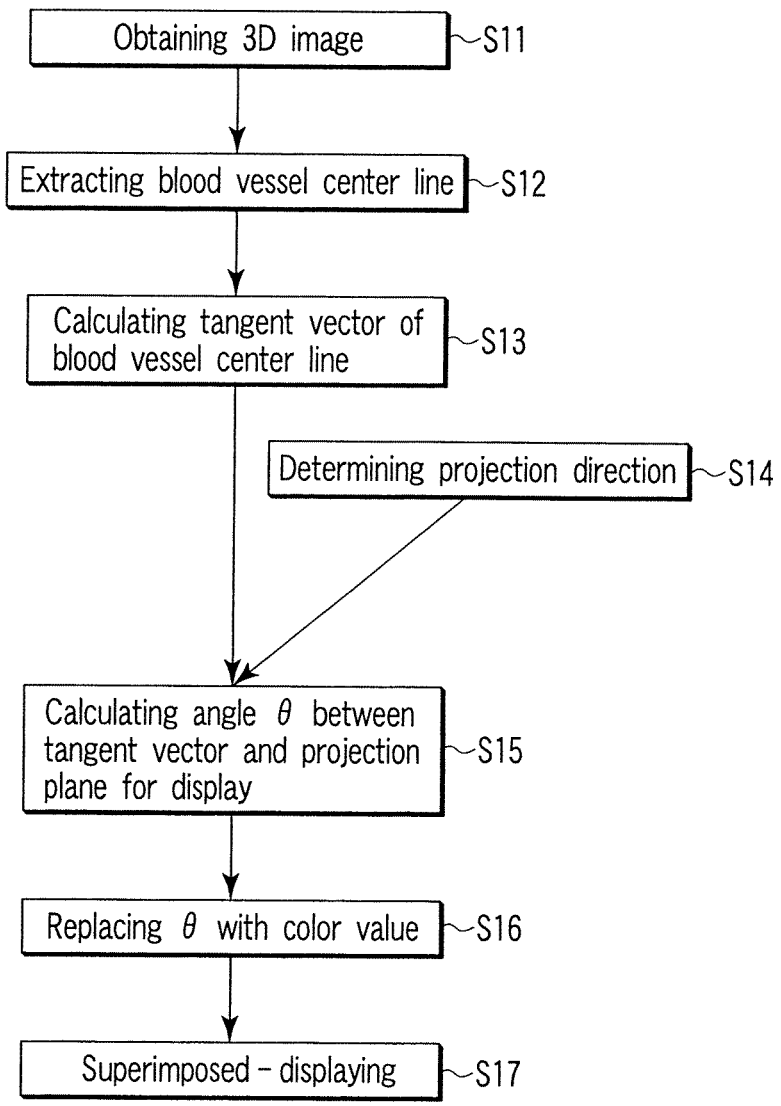
FIG. 19 is a flow chart of a process from the generation to the display of a blood vessel color map in the embodiment.
Figure 20:
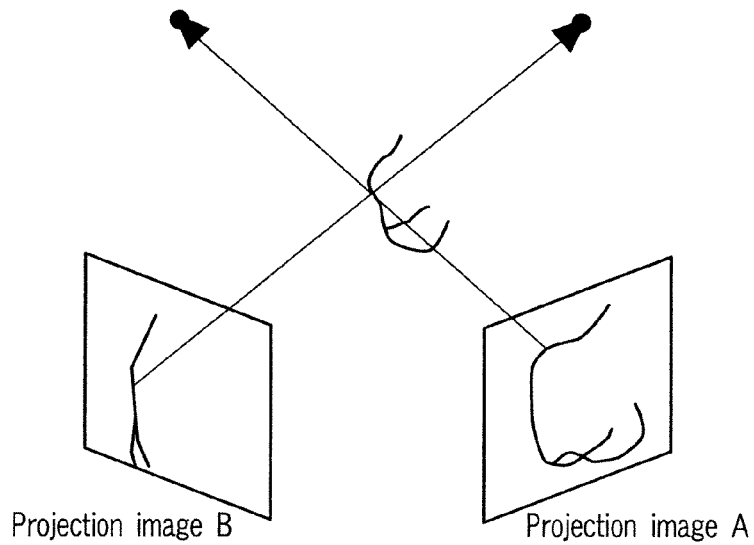
FIG. 20 is a view for supplemental explanation of a process step of "obtaining a 3D image" in FIG. 19.

FIG. 19 illustrates the procedure of the process of generating the color map representing the direction of running of the blood vessel. As exemplified in FIG. 20, images A and B are captured substantially at the same time in different directions by imaging the same part by means of a biplane X-ray imaging apparatus. The blood vessel extraction unit 119 extracts a blood vessel image from the images A and B. From the blood vessel image, 3D image data (also referred to as "volume data") is reconstructed on the basis of the positional relationship between a plurality of corresponding points which are designated on the images A and B by the operator in association with the same part (S11). The 3D image data of the blood vessel is stored in the 3D image data memory unit 132. As mentioned above, the 3D image data may be volume data derived from data that is acquired by other imaging apparatuses such as an X-ray computed tomography imaging apparatus (CT scanner) and a magnetic resonance imaging apparatus (MRI).

Figure 21A:
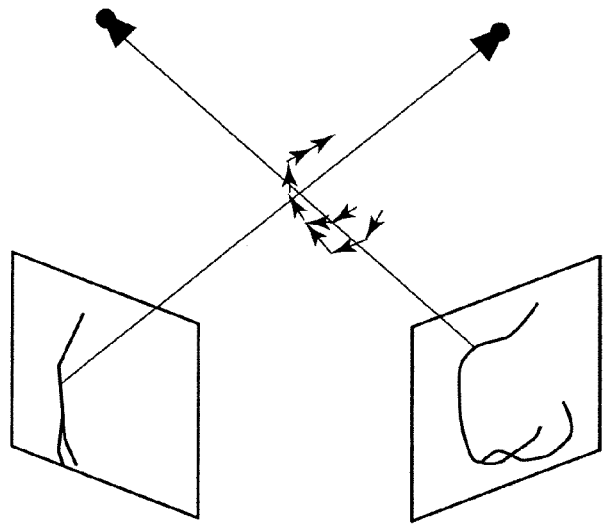
FIG. 21A and FIG. 21B are views for supplemental explanation of a process step of "calculating a tangent vector of a blood vessel center line"
Figure 21B:
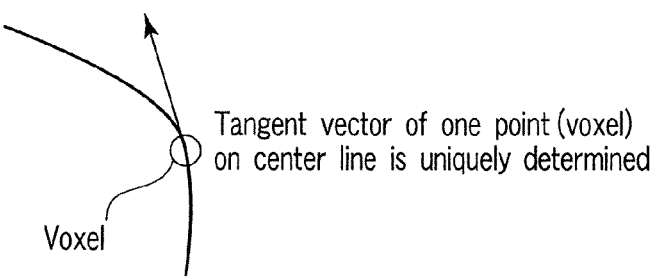

A center axis (center line) of the blood vessel is extracted from the reconstructed volume data (S12). The method of extracting the center line of the blood vessel from the volume data may arbitrarily be chosen from conventional ones. Subsequently, as shown in FIGS. 21A and 21B, with respect to multiple points (voxels) on the center line of the blood vessel, a tangent vector of the blood vessel is calculated with respect to each voxel (S13).

Next, as shown in FIG. 22, the operator sets the view point at an arbitrary position on the 3D coordinates through the operation table 2123, on the basis of where the view point should be set in order to view a desired image. Thereby, the imaging direction is set in an arbitrary direction (S14). When a captured image is used as a reference image by intervention, the imaging direction is set to agree with the direction of the X-ray tube 2112-1 of the X-ray imaging apparatus. If the view point and imaging direction are determined, a projection plane is determined. The angle (crossing angle) of the tangent vector to the projection plane is calculated with respect to each point (voxel) on the blood vessel center line (S15). If a plurality of points position on one projection line, the maximum angle is selected from angles of the points.

The angle is converted to a color value according to a prescribed color table as shown in FIG. 24A, FIG. 24B (S16). Thereby, volume data is generated, wherein the data with a color value, which corresponds to the angle of the direction of running of the blood vessel to the projection plane, is set as the voxel value.

In the example of FIG. 24A, data corresponding to blue is assigned to a voxel with the angle of 0 deg., at which the blood vessel is parallel to the projection plane. Data corresponding to red is assigned to a voxel with the angle of 90 deg., at which the blood vessel is perpendicular to the projection plane. Data corresponding to gradient hues between red and blue are assigned to voxels with intermediate angles. In the example of FIG. 24B, data corresponding to blue is assigned to a voxel with the angle of 0 deg., at which the blood vessel is parallel to the projection plane. Data corresponding to red is assigned to a voxel with the angle of 90 deg., at which the blood vessel is perpendicular to the projection plane. Data corresponding to gradient hues, which are combinesed with yellow, between red and blue are assigned to voxels with intermediate angles.

The blood vessel color map generation unit 2129 projects the volume data, in which the color value corresponding to the angle of the blood vessel to the projection plane is set as the voxel value, on the same projection plane with the same view point and the same view angle as the projection image representing the blood vessel configuration, thereby generating a color map as a projection image representing the direction of running of the blood vessel (i.e. the projection image representing the direction of running of the blood vessel). As exemplified in FIG. 25, the generated color map is superimposed on the projection image representing the blood vessel configuration in an image combining unit 2135, and the resultant image is displayed on the display unit 2127 (S17).

According to the present embodiment, the projection image representing the configuration of the blood vessel is colored in accordance with the angle between the direction of running of the blood vessel and the projection plane. Therefore, the direction of running of the respective parts of the blood vessel, the degree of curve of the blood vessel, etc. can exactly be recognized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
　a memory unit which stores data of a 3D image relating to a target blood vessel within a subject;
　a vector calculation unit which extracts a center axis of the target blood vessel using the data of the 3D image and calculates tangent vectors with respect to multiple points on the center axis;
　an angle calculation unit which calculates angles of the tangent vectors to a projection plane which is orthogonal to said center axis;
　a map generation unit which generates a color map as a projection image representing a direction of running of the target blood vessel by projecting volume data using the same view point, view angle and projection plane as those used in generating a projection image representing a blood vessel configuration;
　a display unit which displays the color map; and
　wherein the map generation unit assigns a color value, which corresponds to the calculated angle, to each of the multiple points.

2. The image processing apparatus according to claim 1, wherein the map generation unit assigns a dot pattern, which corresponds to the calculated angle, to each of the multiple points.

3. The image processing apparatus according to claim 1, wherein in a pre-process for calculating the tangent vector of the target blood vessel, a center axis of the target blood vessel is extracted from the data of the 3D image.

4. The image processing apparatus according to claim 1, further comprising:
　a generation unit which generates data of a 2D image of the target blood vessel by projection onto the projection plane, using the data of the 3D image; and
　a combining unit which combines the data of the 3D image of the target blood vessel and the map data.

5. An image processing method comprising:
　extracting a center axis of a target blood vessel using data of a 3D image of the target blood vessel and calculating tangent vectors with respect to multiple points on the center axis;
　calculating angles of the tangent vectors to a projection plane which is orthogonal to said center axis;
　generating a color map as a projection image representing a direction of running of the target blood vessel by projecting volume data using the same view point, view angle and projection plane as those used in generating a projection image representing a blood vessel configuration, including assigning a color value, which corresponds to the calculated angle, to each of the multiple points; and
　displaying the color map.

\* \* \* \* \*